US 12,316,667 B1

United States Patent
Molony et al.

(10) Patent No.: US 12,316,667 B1
(45) Date of Patent: May 27, 2025

(54) RISK SCORING OF CLOUD PERMISSION ASSIGNMENTS USING SUPERVISED MACHINE LEARNING

(71) Applicant: CrowdStrike, Inc., Sunnyvale, CA (US)

(72) Inventors: Robert Molony, Oakland, CA (US); Michael Brautbar, Wayland, MA (US); Manu Nandan, Frisco, TX (US); Ciaran O'Brien, Astoria, NY (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/903,573

(22) Filed: Oct. 1, 2024

Related U.S. Application Data (63) Continuation of application No. 18/521,834, filed on Nov. 28, 2023.

(51) Int. Cl.
*H04L 9/40* (2022.01)

(52) U.S. Cl.
CPC ........ *H04L 63/1433* (2013.01); *H04L 63/102* (2013.01)

(58) Field of Classification Search
CPC .......................... H04L 63/1433; H04L 63/102
See application file for complete search history.

(56) References Cited

U.S. PATENT DOCUMENTS

| | | | | |
|---|---|---|---|---|
| 9,258,314 B1* | 2/2016 | Xiao | ........................ | H04L 63/14 |
| 11,757,922 B2* | 9/2023 | Seiver | ................... | H04L 63/102 |
| | | | | 370/216 |
| 2014/0053248 A1* | 2/2014 | Hulusi | ...................... | H04L 9/40 |
| | | | | 726/4 |
| 2015/0150110 A1* | 5/2015 | Canning | ............. | H04L 63/0807 |
| | | | | 726/9 |
| 2021/0075814 A1* | 3/2021 | Bulut | ....................... | H04L 63/20 |
| 2023/0259647 A1* | 8/2023 | Yip | ........................ | H04L 63/102 |
| | | | | 726/28 |
| 2024/0356945 A1* | 10/2024 | Kumar | ................... | G06N 20/00 |

FOREIGN PATENT DOCUMENTS

| | | | | | |
|---|---|---|---|---|---|
| CN | 112491916 A | * | 3/2021 | ............. | H04L 41/12 |
| CN | 112929369 A | * | 6/2021 | ......... | H04L 63/1416 |
| CN | 115021983 A | * | 9/2022 | | |
| CN | 116049832 A | * | 5/2023 | | |
| CN | 117527444 B | * | 3/2024 | | |
| CN | 118487861 A | * | 8/2024 | | |
| WO | WO-2017019534 A1 | * | 2/2017 | ............. | G06F 21/45 |

* cited by examiner

*Primary Examiner* — Sarah Su
(74) *Attorney, Agent, or Firm* — Lee & Hayes, P.C.

(57) ABSTRACT

Techniques for calculating risk scores of entity assignments are discussed herein. The system generates a probability matrix using a collaborative filtering technique such as singular value decomposition. The probability matrix is populated with probability values for each entity representing a probability that, based on the various relationships or associations of that entity with other entities, the entity has been granted an assignment. Risk values are used to provide a weighting value to assignments, separating relatively higher risk assignments from relatively lower risk assignments. The system thereafter calculates a risk score for one or more of the entities using the information in the assignment matrix, the probability matrix, and the risk values. The system can flag or identity one or more entities whose risk scores do not meet various criteria.

20 Claims, 4 Drawing Sheets

RISK SCORING OF CLOUD PERMISSION ASSIGNMENTS USING SUPERVISED MACHINE LEARNING

PRIORITY

This application is a continuation of, and claims priority to, U.S. patent application Ser. No. 18/521,834, filed on Nov. 28, 2023, entitled "RISK SCORING OF CLOUD PERMISSION ASSIGNMENTS USING SUPERVISED MACHINE LEARNING," and is fully incorporated by reference herein.

BACKGROUND

Distributed computing services that can be provided by computing resource providers over the Internet are increasingly being utilized to augment and/or supplant on-premises computing resources. These distributed computing services often provide a scalable and flexible solution for users. Because the platform being provided by the distributed computing service needs to service a wide range of user-types, the resources provided need to be done in an environment suited for those wide range of user-types. However, because these distributed environments are often highly configurable and complex, it can be increasingly difficult to ensure that an organization's configurations are secure. The complexity and difficulty in ensuring security is often compounded by the fact that often new services and infrastructure can be introduced and modified relatively quickly.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This application describes techniques for security risk scoring of cloud permission assignments. When calculating a security risk score for one or more entities (e.g., a user/machine/service), examples of the presently disclosed subject matter utilize machine learning models to determine the probably that the entity should have a certain assignment. As used herein, "assignments" are associations of permissions or configurations that allow one or more machines, users, services, and the like to operate in a manner according to the assignment. For example, an assignment may be the association of an administrative role to one or more users or machines that allow the users or machines to modify a system in designated ways. Assignments can be assigned an assignment risk score indicating the relative risk associated with the assignment. For example, an assignment that permits a user to have full read/write access to a system may be designated as a high assignment risk score. In a similar manner, an assignment that permits a user to have read access to a very limited portion of a system may be designated as a low assignment risk score.

However, an entity having an assignment that has a high assignment risk score does not necessarily mean that the entity represents a high security risk and would, therefore, have a high security risk score. Further, an entity having an assignment that has a low assignment risk score does not necessarily mean that the entity represents a low security risk and would have a low security risk score. In some examples, the security risk score is based, at least in part, on whether or not the particular assignment is expected. For example, an administrator may have an assignment that gives the administrator all permissions, e.g., read, write, and the like, on a system. Having that type of access may be associated with an assignment that would be associated with a high assignment risk score. However, if it is expected that the administrator would have that assignment, the security risk score may be relatively low because the assignment is expected. Continuing with the example, a user may have the same assignment that gives the user all permissions, e.g., read, write, and the like, on a system. However, if that assignment is not expected, the security risk score may be relatively high. Thus, an assignment in one context (a high probability that entity has the assignment) may result in a relative low security risk score, whereas the same assignment in another context (a low probability that the entity has the assignment) may result in a relatively high security risk score. The calculated probability may be represented in various manners. For example, the calculated probability may be represented by a sliding scale or range of numerical values from 1" indicating a low probability that the entity would have a certain assignment to "10" indicating a high probability that the entity would have a certain assignment. It should be noted that other manners of indicating a calculated probability may be used, such as percentages, and are considered to be within the scope of the presently disclosed subject matter.

In a still further example, a user may have an assignment that gives the user a low-level permission such as the ability to read or view information. Having that type of access may be associated with an assignment that would be associated with a low assignment risk score. However, if it is expected that the administrator would have that assignment, the security risk score may also be relatively low because the assignment is expected. Continuing with the example, another user may have the same assignment. However, if that assignment is not expected, the security risk score may be relatively high. Thus, as with the example provided above with respect to the high assignment risk score, an assignment in one context (a high probability that entity has the assignment) may result in a relative low security risk score, whereas the same assignment in another context (a low probability that the entity has the assignment) may result in a relatively high security risk score.

However, in some examples, it may be desirable or necessary to place an order or prioritize, in some manner, the entities based on their calculated security risk score. For example, resources may be limited to further analyze or correct every entity having an unexpected assignment. Thus, additionally, or alternatively, the technologies described herein contextualize security risk scores using the calculated probability and the assignment risk score to identify relatively higher risks in a system. Using the examples provided above in which a high assignment risk score and a low assignment risk score were discussed, an unexpected assignment of an assignment having a high assignment risk score may represent a higher security risk than an unexpected assignment of an assignment having a low assignment risk score. Although the reasons may vary according to how a system is configured, in some examples, an entity having an unexpected assignment, i.e., a low probability assignment, that has a high assignment risk score may be a higher security risk than an unexpected assignment, i.e., a low probability assignment, that has a low assignment risk score. Thus, in some examples, higher security risk scores are prioritized over lower security risk scores.

The examples provided above describe security risk scoring based on designated assignments. However, various examples of the presently disclosed subject matter may also identify risks based on undesignated assignments. For example, the model may be used to determine that a particular entity has a high probability of having a specific assignment. An entity may be analyzed and does not have the assignment. This may indicate a risk because the entity may either be misconfigured or is not supposed to evaluated as a particular entity. For example, a user may inadvertently or nefariously identify themselves or their machines as being a particular type of entity when they should not be. Because the identification may be incorrect or nefarious, the entity may not have all the assignments that are expected to be associated with that entity, identifying a potential risk.

In some examples, to compute a security risk score, in a first operation, a computing device generates an assignment matrix using entity data. The entity data can be provided by various sources and includes information such as, but not limited to, a listing of entities to be analyzed, the assignments for each of the entities, and in some examples, the assignment risk score for each assignment in the entity data. The assignment matrix indicates the entities and the permissions for entities. For example, the following matrix #1 may be a portion of a matrix formed from all the assignments available or being analyzed (A1, A2, . . . ) designed for all entities available or being analyzed (user1, user2, . . . ):

$$\begin{array}{ccc} \text{User1} & 1 & 0 \\ \text{User2} & 1 & 1 \\ & A1 & A2 \end{array} \quad \text{Matrix \#1}$$

The entities, i.e., user1 and user2, may be more than one type of entity. For example, the types may include users assigned to different roles within an organization, computer terminals/servers used for different functions, or different software programs, and the like. The presently disclosed subject matter is not limited to any particular type. Further, it should be noted that an entity may be associated with more than one type and have a risk score generated for each type. For example, a user may be a laboratory technician as one type and a university student as another type. A risk score for the user may be generated for each type.

In a second operation to compute a risk score, once the assignment matrix is generated, a collaborative filtering technique is applied by a computing device to the assignment matrix to generate probabilities of assignments for the entities identified in the assignment matrix. In some examples of the presently disclosed subject matter, the collaborative filtering technique used is a decomposition method such as singular value decomposition ("SVD").

SVD can be used to indicate certain properties (e.g., key properties) of a real or complex matrix, especially in large or complex matrices. In the present example of assignment matrix #1, user1 and user2 may be in the same user group where the assignments may be generally expected to be the same. A collaborative filtering technique may be applied and determine that users in the user group to which user1 and user2 belong have a ninety percent (90% or 0.90) probability of having assignment A1 and a 10 percent (10% or 0.10) probability of having assignment A2. To help identify assignments that may be erroneously or incorrectly assigned, some examples of the presently disclosed subject matter invert the probabilities (1–probability) to form a probability matrix, shown by way of example in matrix #2:

$$\begin{array}{ccc} \text{User1} & 0.1 & 0.9 \\ \text{User2} & 0.1 & 0.9 \\ & A1 & A2 \end{array} \quad \text{Matrix \#2}$$

In matrix #2, the values represent a probability that an assignment for a user should be indicated in the matrix #1. It should be understood that the use of inversion is merely an example and may not be used in all examples of the presently disclosed subject matter. In some examples, the probabilities are inverted to mathematically identify low probability assignments and suppress or lower the numerical impact of high probability assignments. Using inversion, it is shown in matrix #2 that there is a high probability (e.g., a "0.1" value in this example) that assignment A1 is assigned to user1 and user2 and a low probability (e.g., a "0.9" value in this example) that assignment A2 is assigned to the user user1 and user2.

To generate a security risk score, the values in the matrix #1 are multiplied by their corresponding values in matrix #2 and weighted using a risk value that indicates a risk associated with a particular assignment. In some examples, a higher risk value indicates a higher risk, and a lower risk value indicates a lower risk. For example, an assignment that gives a user complete access to all functions of a system may be an assignment with a high risk value, whereas an assignment that only gives a user read access to a limited portion of the system may have a low risk value. The risk values of the risk column matrix may be a numerical value received by a user input (or other input) indicating a risk associated with the assignment or permission. For example, assignment A1 may be a relatively lower risk and receive a risk value of 10, whereas assignment A2 may be a relatively higher risk and receive a risk value of 80. As described in more detail below, the risk value when used with the inversion technique described above acts as a weighting factor to more readily identify a high risk assignment assigned to a user in which the assignment has a low probability of being assigned.

Calculating the risk score for user1, the risk score for assignment A1 is $(1)*(0.1)*(10)=1$ and the risk score for assignment A2 is $(0)*(0.9)*(80)=0$. Calculating the risk score for user2, the risk score for assignment A1 is $(1)*(0.1)*(10)=1$ and the risk score for assignment A2 is $(1)*(0.9)*(80)=72$. The relatively high risk score of 72 for user2 associated with assignment A2 may represent a high risk to be further evaluated. User2 has a permission (assignment A2) that, using collaborative filtering techniques, the user2 should have a low probability of having. The risk score is further increased because the assignment A2 that the user2 has is a relatively high risk assignment. The result of the score may be an output that the user2 is "flagged" that the user2 has a high risk associated with at least one of the assignments.

In some examples of the presently disclosed subject matter, an output is generated along with the flag to provide a user or other system with additional information to further evaluate a risk score. In some examples, as noted above, an entity may be associated with more than one type. Thus, in another type, an assignment that may be flagged as high risk in one type may not be a high risk in another type. For example, in the risk score calculated above for user2, user2 received a risk score of 72 for assignment A2. However, in some examples, user2 may also be associated with a type in which there is a high probably that the user2 has assignment A2. Matrix #1 may represent user2 in a type 1 role, such as a university student. However, the user2 may also be in a type 2 role such as a laboratory assistant. Being a laboratory assistant, it may be expected that user2 have assignment A2, e.g., a high probability (e.g., 90%) calculated using collaborative filter techniques. Thus, the risk score for the user2 in the type 2 role for assignment A2 may be $(1)*(0.1)*(80)=8$. The result indicates that the high risk score calculated using matrix #1 may be explained by calculating a risk score for the user2 in other types.

In still further examples, the risk score may be used to flag potential anomalous assignments. For example, a user3 may be added to matrix #1. The user3 is in the same type as users 1 and 2, and thus, would likely have the same permissions. However, user3 does not have assignment A3 (which would be represented as a "0" in column 1, row 3 of matrix #1). Calculating the risk score for user3 for assignment A1 would be $(0)*(0.1)*(10)=0$, while the risk scores for users 1 and 2 for assignment A1 were both 1. Various examples of the presently disclosed subject matter may flag user3 as having (or lacking) a permission that others in the same type have a high probability of having. This may be helpful in changing permissions to increase the consistency of assignments in a type. Another use may be to remove assignments that have remained even though the user may have changed types. A still further use may be to identify potential nefarious users (e.g., hackers) that have generated a user account of particular type but may not be aware of all of the assignments associated with the type. The assignments may include permissions or functional normally used by users in the type and/or may include illusory assignments. Illusory assignments may be assignments for a user that do not provide any functional capabilities but are assigned to potentially locate non-system generated user accounts. For example, users in a type may be granted assignment A4 that has no function. The assignment A4 may have a high risk value associated with the assignment. Thus, the risk score for a user without the assignment A3 may be different than the users with the assignment A3, e.g., the risk score of the entity for the illusory assignment is not an expected value. The system may detect the anomaly and flag the user for further investigation.

In some still further examples of the presently disclosed subject matter, a risk score may be used to provide information regarding reducing a risk. In an example provided above, the risk score calculated for user2 for assignment A2 was $(1)*(0.9)*(80)=72$. Various examples of the presently disclosed subject matter may include a list of assignments that are similar to assignment A2 ("substitute assignments"). For example, assignment A2 may be full read/write access similar to the permission that a system administrator may have. However, other, lower risk substitute assignments may allow some of the functionality of A2, but at a lower risk. For example, an assignment A4 may be identified as a potential, lower risk substitute assignment to assignment A2. Whereas the assignment A2 may grant the user administrative privileges, the substitute assignment A4 may only grant the user read privileges, thus reducing the risk. Some examples of the presently disclosed subject matter may identify an entity with a high risk score and, using a substitute assignment list, recommend one or more substitute assignments to potentially lower the calculated risk score. After an assignment is changed to the substitute assignment, the risk score can be recalculated to determine an updated risk score.

Figure 1:
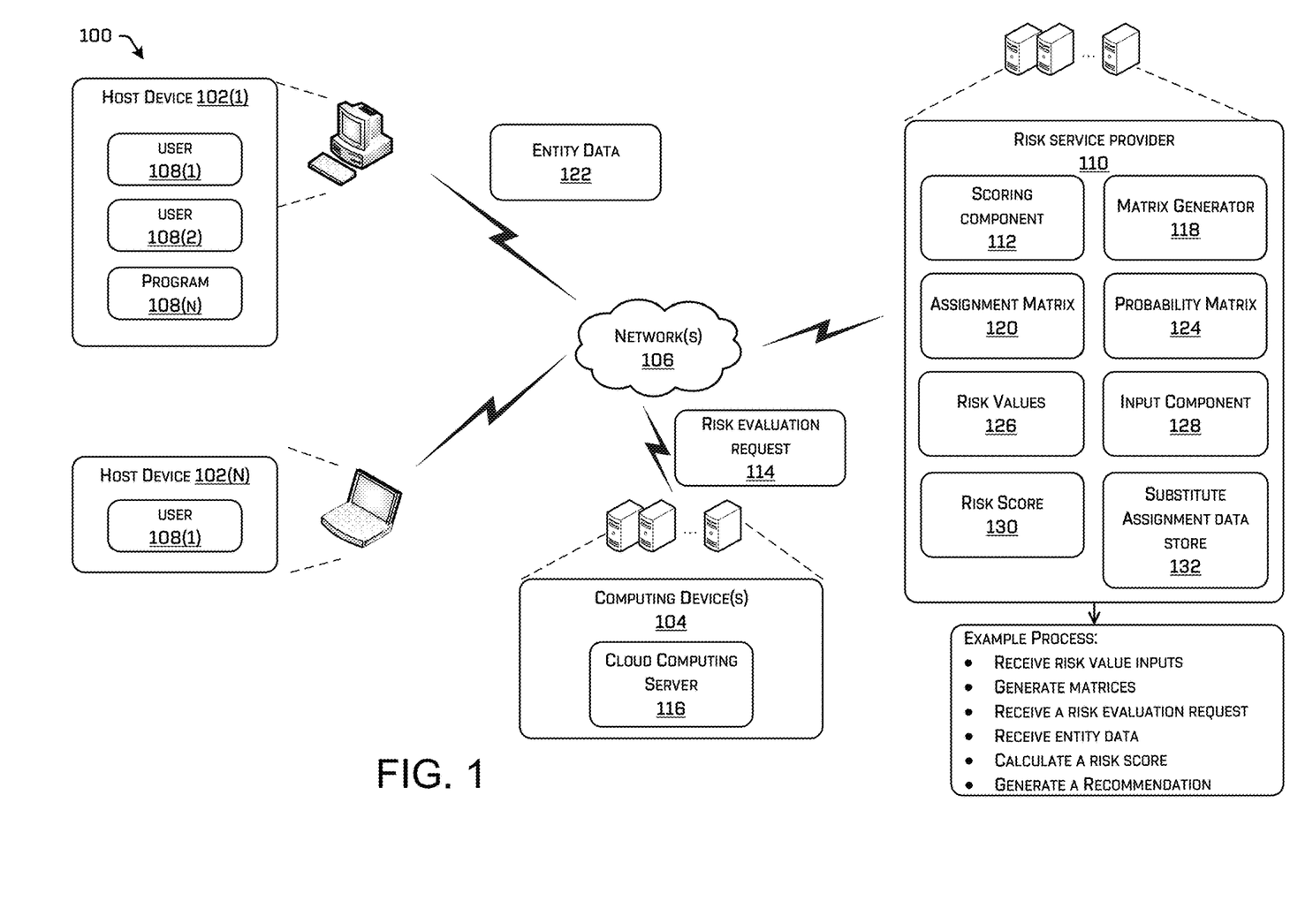
FIG. 1 illustrates an example block diagram of an example computer architecture for calculating a risk score to reduce a potential security issue, as described herein.

FIG. 1 illustrates an example block diagram 100 of an example computer architecture for calculating a risk score using a probability of assignments, as described herein. The diagram 100 may include one or more host device(s) 102(1) and 102(N) (individually and/or collectively referred to herein with reference 102), where N is any integer greater than or equal to 1, that interact with host device(s) 104 of a system (e.g., a service system, a security system or a combination thereof) over a network 106. In various examples, the system may be associated with a cloud-based service network that is configured to implement aspects of the functionality described herein. The host device(s) 102 may be or include any suitable type of host device(s) 102, including, without limitation, a mainframe, a work station, a personal computer (PC), a laptop computer, a tablet computer, a personal digital assistant (PDA), a cellular phone, a media center, an embedded system, a robotic device, a vehicle, a Machine to Machine device (M2M), an unmanned aerial vehicle (UAV), an Internet of Things (IoT), or any other type of device or devices capable of communicating with the computing device(s) 104 via the network 106.

In some embodiments, the network 106 may include any one or more networks, such as wired networks, wireless networks, and combinations of wired and wireless networks. Further, the network 106 may include any one or combination of multiple different types of public or private networks (e.g., cable networks, the Internet, wireless networks, etc.). In some instances, the host device(s) 102 and the computing device(s) 104 communicate over the network 106 using a secure protocol (e.g., https) and/or any other protocol or set of protocols, such as the transmission control protocol/Internet protocol (TCP/IP).

The host device(s) 102 (also referred to as "host computing device," "host device," or "monitored computing device") may be used by one or more entities, identified in FIG. 1 as users 108(1) and 108(2), as well as program 108(N) (collectively referred to herein as "entities 108," and individually as "user 108(1)," "user 108(2)," or "user 108(N)"), where N is any integer greater than or equal to 1). The user 108(1) is shown as being associated with both the host device 102(1) and the host device 102(N). This situation may occur if the user 108(1) has different roles within an organization or uses different computing resources to achieve different objectives. The entities 108 can be various types of users, entities, computing systems, and the like, that are assigned permissions, capabilities, or functions including, but not limited to, an object, a collection of user accounts, computer accounts, and other groups. As used herein, and as discussed above, an "entity" may be a user, computer program, computer/server, and the like that has been granted a right to perform one or more functions, i.e., an "assignment."

A risk service provider 110 may provide assignment risk scoring services to various devices, such as the computing device(s) 104 or the host device(s) 102. The risk service provider 110 may be a functional part of the computing device(s) 104 and/or host device(s) 102, or, be separate from and provide services to the computing device(s) 104 and/or host device(s) 102. In some examples, the risk service provider 110 can receive risk scoring requests from the computing device(s) 104 and/or from the host device(s) 102. In some examples, the risk scoring services provided by the risk service provider 110 may be offered as a service to evaluate security risks associated with various entities 108.

In some examples, the risk service provider 110 includes a scoring component 112. The scoring component 112 is executed when one of the host device(s) 102 or the computing device(s) 104 transmits a risk evaluation request 114 to the risk service provider 110. In the example illustrated in FIG. 1, a cloud computing server 116 of the computing device(s) 104 transmitted the risk evaluation request 114 to the risk service provider 110 to calculate risk scores for the entities 108 using the host device 102(1). The cloud computing server 116 can be one or more computing devices that provide cloud computing services to the host device(s) 102. It should be understood that the cloud computing server 116 may be more than one server and may be scalable to have different computing resources based on the resource needs of the host device(s) 102. The entities 108 include user 108(1), user 108(2), and program 108(N). The risk service provider 110 transmits the risk evaluation request 114 to the scoring component 112. It should be noted that the presently disclosed subject matter is not limited to the risk evaluation request 114 being generated or sent from the cloud computing server 116. For example, the host device(s) 102 may generate and transmit the risk evaluation request 114 to the scoring component 112.

As noted above, the risk service provider 110 is configured to provide risk scoring services. To calculate a risk score for the entities 108 identified as the user 108(1), the user 108(2), and the program 108(N), the scoring component invokes a matrix generator 118. The matrix generator 118 provides the matrix generation functions describe above with regard to matrices #1 and #2. For example, the matrix generator 118 first generates an assignment matrix 120 using entity data 122 provided by the host device 102(1) for the user 108(1), the user 108(2), and the program 108(N). In some examples, the entity data 122 includes a listing of the identities of the entities (e.g., the user 108(1), the user 108(2), and the program 108(N)) and the assignments for each of the entities. The matrix generator 118 thereafter generates the assignment matrix 120.

After the assignment matrix 120 is generated, the matrix generator 118 generates a probability matrix 124, an example of which is provided by way of example as matrix #2, above. As discussed above, the matrix generator 118 may apply a collaborative filtering technique, such as singular value decomposition, applied to the assignment matrix 120 to generate probabilities of assignments for the entities identified the assignment matrix 120. It should be noted that the presently disclosed subject matter is not limited to a generation of either or both of the assignment matrix 120 and/or the probability matrix 124 when calculating a risk score in response to receiving the risk evaluation request 114. In some examples, a previously generated assignment matrix 120 and/or probability matrix 124 may be used. In these examples, the matrix generator 118 may update the previously generated assignment matrix 120 and/or probability matrix 124 with the entity data 122. For example, the user 108(1) may have been granted a new assignment. The matrix generator 118 may use the previously generated probability matrix 124 to calculate a risk score for the user 108(1) rather than recomputing a new probability matrix 124.

Once the probability matrix 124 is generated, or a previously generated assignment matrix 124 is identified, the scoring component calculates one or more risk scores using risk values 126. As noted above, a risk value is an alphamerical value that indicates a relative risk associated with a particular assignment, i.e., puts a weighting factor on the assignment. An input component 128 is used to receive inputs indicating a risk value for the assignments. The risk value, in some examples, is a value from 0 to 100, with 0 indicating low risk and 100 indicating a high risk. The presently disclosed subject matter is not limited to any particular range of risk value used and can include any values in the range. For example, a risk value of an assignment may be various values between 0 and 100, such as 50, 75, and other values. The input component 128 may receive an input about a risk value for an assignment from a user (not shown) or other entity.

The risk values may be received using various technologies. For example, the risk values of assignments may be received from a user input. The user input may be used to incorporate some degree of subject matter expertise or knowledge into various examples of the currently disclosed subject matter. In another example, the risk values may be input using a "rules-based" model in lieu of, or in addition to, the user input. In this example, an assignment receives risk value based on one or more of attributes of the assignment or entity rather than the identity of the assignment itself. For example, policies that can give users access to change permissions can be given a high risk value, whereas policies that can only list some resource names can be given a low risk value.

For example, assignment A2 discussed above is an assignment that gives an entity full read/write access to the system. Thus, the assignment received a high risk value. However, new assignments may be generated, whereby it may be beneficial or necessary for the risk value to be assigned by a computing device rather than receive a user input. In these examples, a rules-based risk value model can be applied and used. Continuing with the present example, a rules-based risk value model may indicate that assignments having an attribute of full system access, regardless of whether that access is read and/or write, may be a high risk assignment. Thus, the rules-based risk value model may be used to automatically applied a high risk value to any assignment with that attribute. In another example, the rules-based risk value model may assign a risk value not on the assignment, but the entity to which the assignment is provided. For example, the rules-based risk value model may indicate that any assignment to an entity that is signed in as a "guest" or is not an non-employee, for example, may have a high risk value regardless of the assignment. Using the weights, a score in the range (0, 100) can be generated for every possible assignment. Multiplying the rule based score and (1−the predicted likelihood) gives the final risk score prediction of a particular permission assignment to a user. The user's overall risk score is then simply the max over all their component permission risk scores.

As described above, the scoring component 112 calculates risk scores 130 for one or more entities, assignments, and the like, using the assignment matrix 120, the probability matrix 124, and the risk values 126. The scoring component 112 identifies (or "flags") one or more entities whose risk score 130 exceeds a predetermined value, a predetermined difference ("differential value"), or other types of result. For example, and not by way of limitation, the user 108(1) may be flagged if the risk score for the user 108(1) is at or greater than a predetermined value (e.g., 75). In another example, and not by way of limitation, the user 108(1) may be flagged if the risk score calculated for the user 108(1) is more than a predetermined value greater than or less than other similar entities. For example, the user 108(1) may be flagged if the calculated risk score is 50, whereas the calculated risk scores for similar users is no greater than 10 ("differential value"). Thus, even though the calculated risk score for the user 108(1) may not be greater than a upper risk score limit, the difference in risk scores may also indicate an issue with the assignments of the user 108(1).

As noted above, along with flagging potential security risks caused by various assignments, some examples of the presently disclosed subject matter may provide remediation or security reduction recommendations. In some of these examples, a substitute assignment data store 132 may be used. A substitute assignment may be one or more assignments that are functionally or operationally similar to some higher risk assignments but have a lower risk value. The substitute assignment data store 132 may be a list or table of substitute assignments accessible to the scoring component 112. If a user is flagged as having a high risk score due to a certain assignment, the scoring component 112 may access the substitute assignment data store 132 and retrieve one or more lower risk substitute assignments. The one or more substitute assignments may be provided to a requesting entity to potentially reduce a risk score.

Though depicted in FIG. 1 as separate components of the risk service provider 110, functionality associated with the scoring component 112, the matrix generator 118, and the input component 128 can be included in a different component of the service system, can be included in the host device(s) 102, and/or the computing device(s) 104. In some instances, the components described herein may comprise a pluggable component, such as a virtual machine, a container, a serverless function, etc., that is capable of being implemented in a service provider and/or in conjunction with any Application Program Interface (API) gateway.

Figure 2:
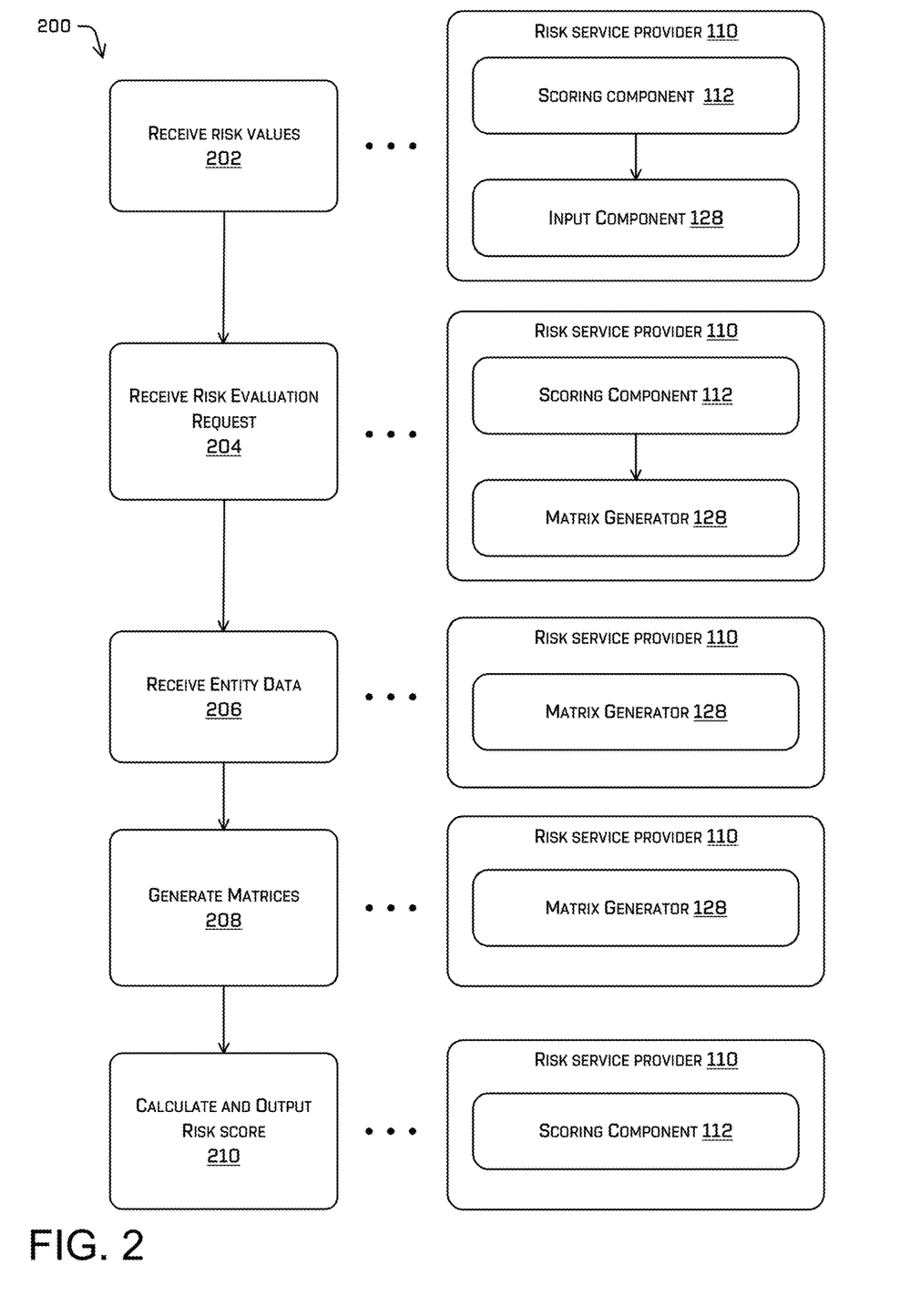
FIG. 2 is a pictorial diagram illustrating an example process for calculating a risk score to reduce a potential security issue to protect a computing device, as described herein.

FIG. 2 is a pictorial diagram illustrating an example process 200 to calculate a risk score to protect a host device(s) 102, as described herein. The example process 200 may be implemented by a computing device such as the risk service provider 110 of FIG. 1. The risk service provider 110 can implement the scoring component 112, the matrix generator 118, and the input component 128 to calculate a risk value 126 and recommendation for sending to device requesting a risk evaluation.

An operation 202 can include receiving at the scoring component 112 of the risk service provider 110 the risk values 126 associated with assignments of entities 108. The risk values 126 can be entered by one or more users or received from other inputs using the input component 128. The presently disclosed subject matter is not limited to any particular source of the risk values 126. The risk values 126 are a designation indicating a relative level of risk associated with a particular assignment.

At operation 204, the risk evaluation request 114 is received by the scoring component 112. In the example illustrated in FIG. 1, the cloud computing server 116 of the computing device(s) 104 transmits the risk evaluation request 114 to the risk service provider 110 to calculate risk scores for the entities 108 using the host device 102(1). It should be noted that the presently disclosed subject matter is not limited to the risk evaluation request 114 being generated or sent from the cloud computing server 116. For example, the host device(s) 102 may generate and transmit the risk evaluation request 114 to the scoring component 112. The scoring component 112 transmits a notice to the matrix generator 118 that the risk evaluation request 114 has been received.

At operation 206, the matrix generator 118 receives the entity data 122 that will be used to calculate the risk score. If the assignment matrix 120 and/or the probability matrix 124 are not previously generated, the matrix generator 118 also uses the entity data 122 to generate the assignment matrix 120 and/or the probability matrix 124.

At operation 208, the matrix generator 118 uses the entity data 122 to generate the assignment matrix 120 and/or the probability matrix 124. The assignment matrix 120 is generated by the matrix generator 118 using the entity data 122, which includes the assignments for each of the entities 108. To generate the probability matrix 124, the matrix generator 118 uses a collaborative filtering technique, such as singular value decomposition, applied to the assignment matrix 120. to generate probabilities of assignments for the entities identified the assignment matrix 120.

At operation 210, the scoring component 112 calculates a risk score using the assignment matrix 120, the probability matrix 124, and the risk values 126 received at operation 202. The scoring component 112 identifies (or "flags") one or more entities whose risk score 130 exceeds a predetermined value, a predetermined difference, or other types of result. For example, and not by way of limitation, the user 108(1) may be flagged if the risk score is at or greater than a predetermined value, is more than a predetermined value greater than or less than other similar entities (e.g., an unexpected risk score). The scoring component 112 can also provide recommendations along with indicating potential security issues. In the example illustrated above, the scoring component 112 may use the substitute assignment data store 132 and retrieve one or more lower risk substitute assignments to potentially reduce a risk score.

Figure 3:
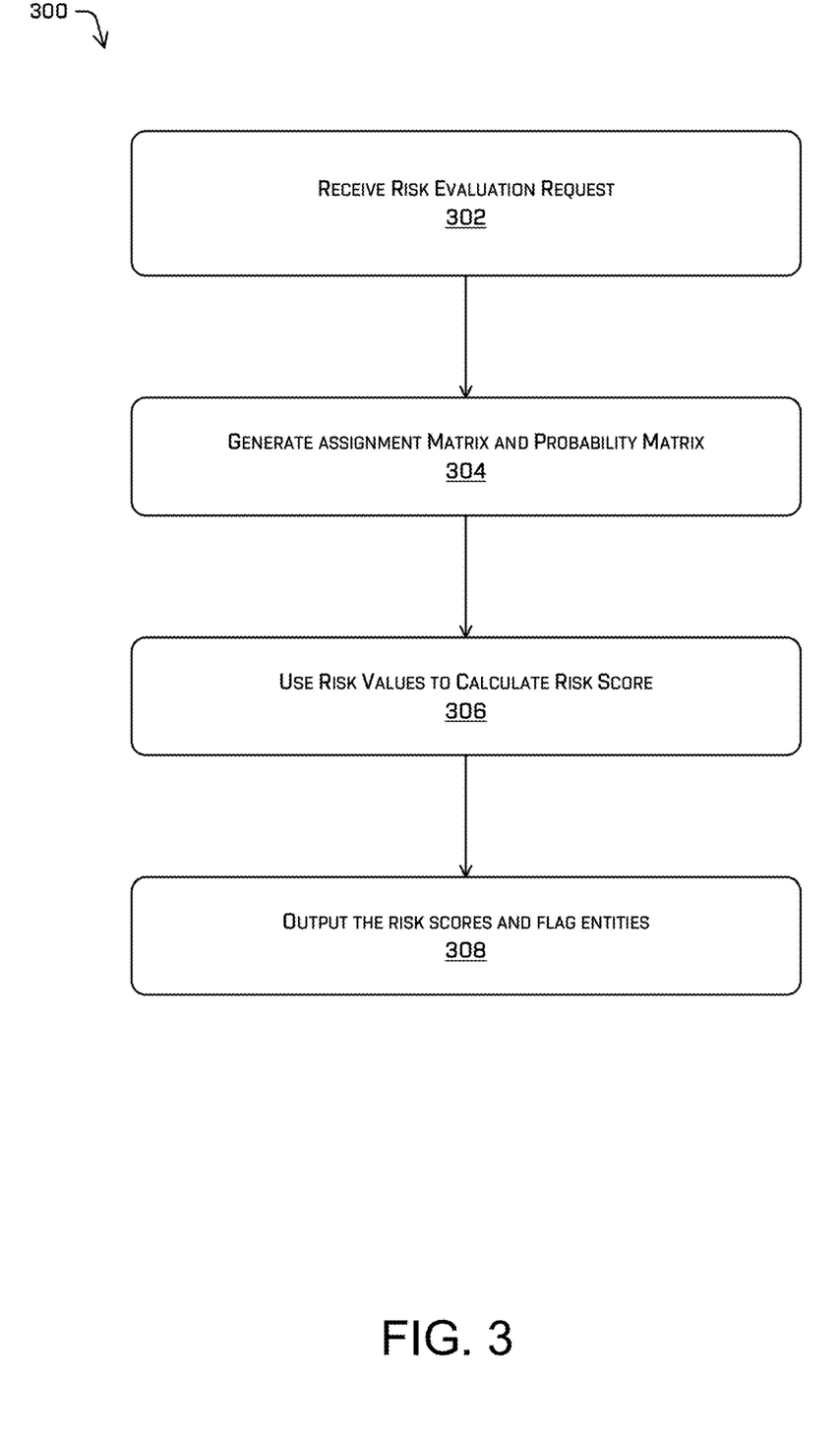
FIG. 3 is a flowchart depicting an example method for calculating a risk score to reduce a potential security issue to protect a computing device, as disclosed herein.

FIG. 3 is a flowchart depicting an example process 300 for calculating a risk score to evaluate a risk associated with entities. Some or all of the process 300 may be performed by one or more components in FIG. 1 or in operations described in FIG. 2.

At operation 302, the process 300 commences by receiving the risk evaluation request 114. As noted above, the presently disclosed subject matter is not limited to any particular source or origin for the risk evaluation request 114. For example, the risk service provider 110 may be contracted to provide risk evaluation services to the host device(s) 102 and, as part of the contract, may generate its own risk evaluation request 114. In another example, the host device(s) 102 may transmit the risk evaluation request 114 to monitor entities 108. In a still further example, the risk evaluation request 114 may be generated and transmitted by a third-party entity not illustrated in FIG. 1. These and other examples are considered to be within the scope of the presently disclosed subject matter. The risk evaluation request 114 can include, or be accompanied by, the entity data 122 that includes an identification of the entities, the potential assignments, and the assignments granted to each of the entities.

At operation 304, the process 300 can include using the entity data 122 to generate the assignment matrix 120 and the probability matrix 124. As noted above, the scoring component 112 may use a previously generated assignment matrix 120 and/or probability matrix 124. In this instance, the scoring component 112 may use the entity data 122 to update the previously generated assignment matrix 120 and/or the previously generated probability matrix 124.

At operation 306, risk scores are calculated using the risk values 126. As discussed above, the risk values 126 are a weighting factor to helps to differentiate relatively higher risk assignments from relatively lower risk assignments. In some examples, this can reduce the identification of low level risks. The weighting factor increases the risk score of relatively higher risk assignments while reducing the risk score of relatively lower level assignments.

At operation 308, the risk scores 130 are transmitted and entities having risk scores meeting certain criteria are flagged. For example, and not by way of limitation, the entity 108 may be flagged if the risk score is at or greater than a predetermined value or is less than other similar entities (e.g., an unexpected risk score).

Figure 4:
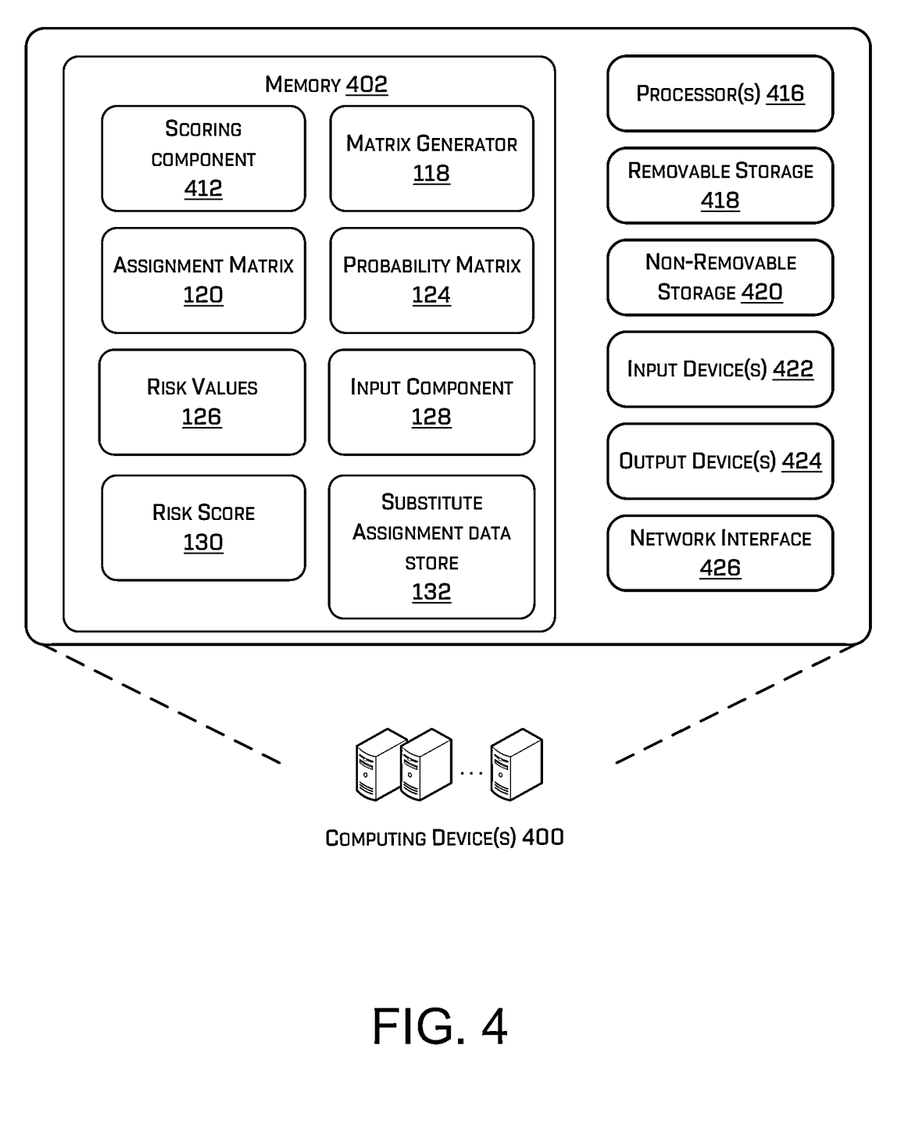
FIG. 4 is a block diagram of an illustrative computing architecture to implement the techniques describe herein.

FIG. 4 is a block diagram of computing device(s) 400 that may be used to implement various devices of the presently disclosed subject matter, such as the risk service provider 110 of FIG. 1. It is to be understood in the context of this disclosure that the computing device(s) 400 can be implemented as a single device or as a plurality of devices with components and data distributed among them. By way of example, and without limitation, the computing device(s) 400 can be implemented as various computing device 400(1), 400(2), . . . , 400(N) where N is an integer greater than 1.

As illustrated, the computing device(s) 400 comprises a memory 402 storing information such as the assignment matrix 120, the probability matrix 124, the risk values 126, the risk score 130, and/or the substitute assignment data store 132. The memory 402 may also store computer-readable instructions used to execute the scoring component 112 and/or the matrix generator 118. It should be understood that one or more of the components or data stored in the memory 402 may be stored in one or more computing device(s) including third-party computing devices. Also, the computing device(s) 400 includes processor(s) 416, a removable storage 418 and non-removable storage 420, input device(s) 422, output device(s) 424, and network interface 426.

In various embodiments, memory 402 is volatile (such as RAM), non-volatile (such as ROM, flash memory, etc.) or some combination of the two. The assignment matrix 120, the probability matrix 124, the risk values 126, the risk score 130, the substitute assignment data store 132, the scoring component 112, and/or the matrix generator 118 stored in the memory 402 can comprise computer-implemented methods, threads, processes, applications or any other sort of executable instructions. The assignment matrix 120, the probability matrix 124, the risk values 126, the risk score 130, the substitute assignment data store 132, the scoring component 112, and/or the matrix generator 118 can also include files and databases.

In various embodiments, the computer-readable memory 402 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 402 may also be described as computer storage media or non-transitory computer-readable media, and may include volatile and non-volatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the identified information and which can be accessed by the security service system. Any such memory 402 may be part of the security service system. In some instances, any or all of the devices and/or components of the computing device(s) 400 may have features or functionality in addition to those that FIG. 4 illustrates. For example, some or all of the functionality described as residing within any or all of the computing device(s) 400 may reside remotely from that/those computing device(s) 400, in some implementations.

The computing device(s) 400 may be configured to communicate over a telecommunications network using any common wireless and/or wired network access technology. Moreover, the computing device(s) 400 may be configured to run any compatible device operating system (OS), including but not limited to, Microsoft Windows Mobile, Google Android, Apple iOS, Linux Mobile, as well as any other common mobile device OS.

The computing device(s) 400 also can include input device(s) 422, such as a keypad, a cursor control, a touch-sensitive display, voice input device, etc., and output device(s) 424 such as a display, speakers, printers, etc. These devices are well known in the art and need not be discussed at length here.

As illustrated in FIG. 4, the computing device(s) 400 also includes the network interface 426 that enables the computing device(s) 400 of the security service system to communicate with other computing devices, such as any or all of the host device(s) 102.

FIGS. 2 and 3 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed processes could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing computer-executable instructions that, when executed, cause the one or more processors to perform operations comprising:
      receiving entity data comprising:
         identities of an entity and a plurality of second entities;
         a listing of assignments associated with the entity and the plurality of second entities; and
         the assignments of the listing of assignments granted to the entity and the plurality of second entities;
      generating an assignment matrix based on the entity data;
      generating a probability matrix by implementing a collaborative filtering technique on the assignment matrix, wherein the probability matrix comprises values indicating a probability that the entity or the plurality of second entities is granted a particular assignment;
      receiving risk values comprising weighting values for the assignments in the listing of assignments, whereas the weighting values are used to differentiate relatively higher level assignments from relatively lower level assignments;
      generating a risk score for the entity using the assignment matrix, the probability matrix, and the risk values; and
      flagging the entity when the risk score meets a criteria.

2. The system of claim 1, further comprising computer-executable instructions that, when executed, cause the one or more processors to perform operations comprising generating a recommendation when the risk score meets the criteria.

3. The system of claim 2, wherein the recommendation comprises an identification of a substitute assignment to reduce the risk score, wherein the substitute assignment provides some functionality of an assignment associated with the risk score.

4. The system of claim 1, wherein the criteria comprises a risk score that is at or greater than a predetermined value, a risk score that is less than a predetermined value, or a risk score that exceeds a differential value.

5. The system of claim 1, wherein the computer-executable instructions for generating the assignment matrix comprises updating a previously generated assignment matrix using the entity data.

6. The system of claim 1, wherein the computer-executable instructions for generating the probability matrix comprises retrieving a previously generated probability matrix.

7. The system of claim 1, further comprising computer-executable instructions that, when executed, cause the one or more processors to perform operations comprising generating a second risk score for a second entity upon adding the second entity as one of the plurality of second entities.

8. The system of claim 1, wherein the risk values are received from a user input or from a rules-based model.

9. One or more non-transitory computer-readable media storing instructions executable by one or more processors, wherein the instructions, when executed, cause the one or more processors to perform operations comprising:
   receiving entity data to generate a risk score for an entity, the entity data comprising:
      identities of the entity and a plurality of second entities;
      a listing of assignments associated with the entity and the plurality of second entities; and
      an indication of assignments from the listing of assignments granted to the entity and the plurality of second entities;
   generating an assignment matrix comprising the entity data;
   generating a probability matrix by implementing a collaborative filtering technique on the assignment matrix, wherein the probability matrix comprises values indicating a probability that the entity or the plurality of second entities is granted a particular assignment;
   receiving risk values comprising weighting values for the assignments in the listing of assignments, whereas the weighting values are used to differentiate relatively higher level assignments from relatively lower level assignments;

generating a risk score for the entity using the assignment matrix, the probability matrix, and the risk values; and flagging the entity when the risk score meets a criteria.

10. The one or more non-transitory computer-readable media of claim 9, further comprising instructions that, when executed, cause the one or more processors to perform operations comprising generating a recommendation when the risk score meets the criteria.

11. The one or more non-transitory computer-readable media of claim 10, wherein the recommendation comprises an identification of a substitute assignment to reduce the risk score, wherein the substitute assignment provides some functionality of an assignment associated with a risk score.

12. The one or more non-transitory computer-readable media of claim 9, wherein the criteria comprises a risk score that is at or greater than a predetermined value, a risk score that is less than a predetermined value, or a risk score that exceeds a differential value.

13. The one or more non-transitory computer-readable media of claim 9, wherein the instructions for generating the assignment matrix comprises updating a previously generated assignment matrix using the entity data.

14. The one or more non-transitory computer-readable media of claim 9, wherein the instructions for generating the probability matrix comprises retrieving a previously generated probability matrix.

15. The one or more non-transitory computer-readable media of claim 9, further comprising instructions that, when executed, cause the one or more processors to perform operations comprising generating a second risk score for a second entity upon adding the second entity as one of the plurality of second entities.

16. The one or more non-transitory computer-readable media of claim 9, further comprising instructions that, when executed, cause the one or more processors to perform operations comprising flagging the entity when the risk score of the entity for an illusory assignment is not an expected value.

17. A computer-implemented method comprising:

receiving entity data to generate a risk score for an entity and a plurality of second entities, the entity data comprising:

identities of the entity and the plurality of second entities;

a listing of assignments associated with the entity and the plurality of second entities; and an indication of assignments from the listing of assignments granted to the entity and the plurality of second entities; and generating an assignment matrix comprising the entity data;

generating a probability matrix by implementing a collaborative filtering technique on the assignment matrix, wherein the probability matrix comprises values indicating a probability that the entity or the plurality of second entities is granted a particular assignment;

receiving risk values comprising weighting values for the assignments in the listing of assignments, whereas the weighting values are used to differentiate relatively higher level assignments from relatively lower level assignments;

generating the risk score for the entity using the assignment matrix, the probability matrix, and the risk values; and flagging the entity when the risk score meets a criteria.

18. The computer-implemented method of claim 17, further comprising generating a recommendation when the risk score meets the criteria, wherein the recommendation comprises an identification of a substitute assignment to reduce the risk score, wherein the substitute assignment provides some functionality of an assignment associated with a risk score, and wherein the criteria comprises a risk score that is at or greater than a predetermined value, a risk score that is less than a predetermined value, or a risk score that exceeds a differential value.

19. The computer-implemented method of claim 17, wherein generating the assignment matrix comprises updating a previously generated assignment matrix using the entity data, and wherein generating the probability matrix comprises retrieving a previously generated probability matrix.

20. The computer-implemented method of claim 17, further comprising flagging the entity when the risk score of the entity for an illusory assignment is not an expected value.

* * * * *